「12」 United States Patent
Chu et al.

(10) Patent No.: US 7,714,556 B2
(45) Date of Patent: May 11, 2010

(54) QUICK RESPONSE SWITCHING REGULATOR AND CONTROL METHOD THEREOF

(75) Inventors: Kwan-Jen Chu, Hsinchu (TW); Tzu-Huan Chiu, Jhubei (TW); Nien-Hui Kung, Hsinchu (TW); Chien-Ping Lu, Tainan (TW)

(73) Assignee: Richtek Technology Corp., Hsinchu (TW)

( * ) Notice: Subject to any disclaimer, the term of this patent is extended or adjusted under 35 U.S.C. 154(b) by 292 days.

(21) Appl. No.: 11/892,987

(22) Filed: Aug. 29, 2007

(65) Prior Publication Data
US 2008/0174286 A1   Jul. 24, 2008

(30) Foreign Application Priority Data
Jan. 23, 2007   (TW) ............................... 96102562 A (51) Int. Cl.
*G05F 1/40*   (2006.01)

(52) U.S. Cl. ...................................... 323/282; 323/222

(58) Field of Classification Search ......... 323/282–290, 323/222, 224, 272, 275, 271; 363/21.12–21.18, 363/95, 131, 97
See application file for complete search history.

(56) References Cited

U.S. PATENT DOCUMENTS

| 6,495,995 | B2 * | 12/2002 | Groom et al. ................ 323/283 |
| 7,304,464 | B2 * | 12/2007 | Weng et al. .................. 323/285 |
| 7,482,793 | B2 * | 1/2009 | Stoichita ...................... 323/282 |

* cited by examiner

*Primary Examiner*—Rajnikant B Patel
(74) *Attorney, Agent, or Firm*—Rosenberg, Klein & Lee (57) ABSTRACT

A quick response switching regulator comprises a power stage having a pair of high-side switch and low-side switch and an inductor connected together by a switching node, a feedback circuit for producing a feedback signal, and a control circuit producing control signals with reference to the feedback signal to control the pair of high-side switch and low-side switch. The feedback circuit is connected to the switching node to shorten the feedback path and speed up the response. The control circuit further monitors the current flowing through the inductor to keep the low-side switch off before the peak of the inductor current becomes higher than a value.

13 Claims, 7 Drawing Sheets

Fig. 2

Prior Art

Prior Art

QUICK RESPONSE SWITCHING REGULATOR AND CONTROL METHOD THEREOF

FIELD OF THE INVENTION

The present invention is related generally to a power converter and, more particularly, to a quick response switching regulator.

DESCRIPTION OF PRIOR ART

Switching regulator is a voltage converting circuit, typically applied in power supplies, for converting an alternative current (AC) voltage or a direct current (DC) voltage to a regulated voltage. A switching regulator includes a control circuit and a power stage configured such that the control circuit manipulates the power stage by pulse width modulation (PWM) or pulse frequency modulation (PFM) to regulate an output voltage. According to the type of the power devices in the power stage, switching regulators can be categorized into synchronous switching regulators and asynchronous switching regulators.

Figure 1:
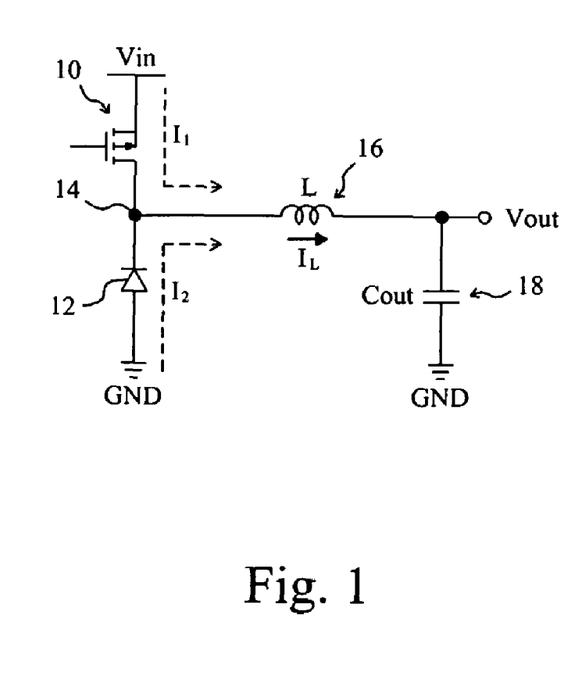
FIG. 1 shows a power stage of an asynchronous switching regulator.
Figure 2:
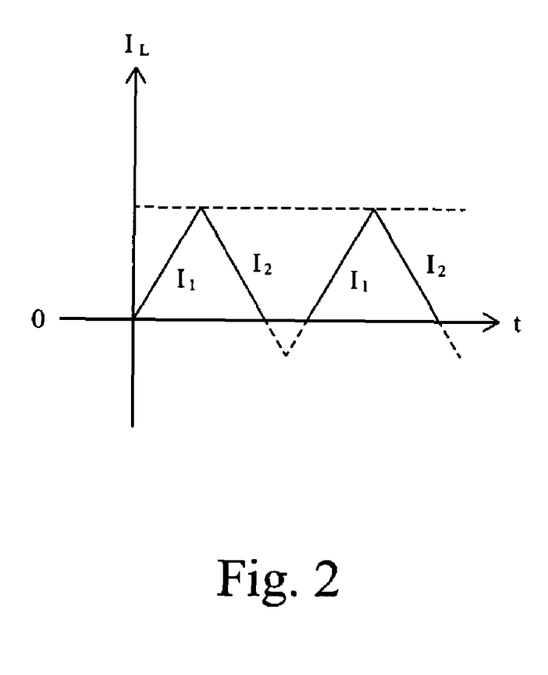
FIG. 2 is a waveform diagram of the inductor current of an asynchronous switching regulator in light load condition.

FIG. 1 briefly shows a power stage of an asynchronous switching regulator, which includes a transistor 10 as the high-side element connected between a power input Vin and a switching node 14 for being switched, and a diode 12 as the low-side element connected between the switching node 14 and a ground terminal GND. This regulator has the inductor current $I_L$ as shown in FIG. 2 when it is in light load or no load condition. When the transistor 10 is conductive, current $I_1$ flows from the power input Vin to the output terminal Vout through the transistor 10 and an inductor 16 to charge a capacitor 18, and thus the output voltage Vout increases. When the transistor 10 is switched off, the current $I_1$ terminated, and the inductor 16 maintains a current $I_2$ which flows from the ground terminal GND to the output terminal Vout through the diode 12 and the inductor 16 in a decreasing manner, until the current $I_2$ becomes zero. Because the diode 12 is a rectifier element, it prevents reverse current flowing from the capacitor 18 to the ground terminal GND through the inductor 16, thereby not wasting power consumption, and as a result an asynchronous switching regulator has pulse skipping function when it is in light load or no load condition, by which the transistor 10 is kept off for one or more switching cycles until the output voltage Vout drops down to a threshold. As long as the capacitor 18 has been charged enough to maintain the output voltage Vout above the threshold, the transistor 10 will not be switched on, thus reducing the switching loss.

Figure 3:
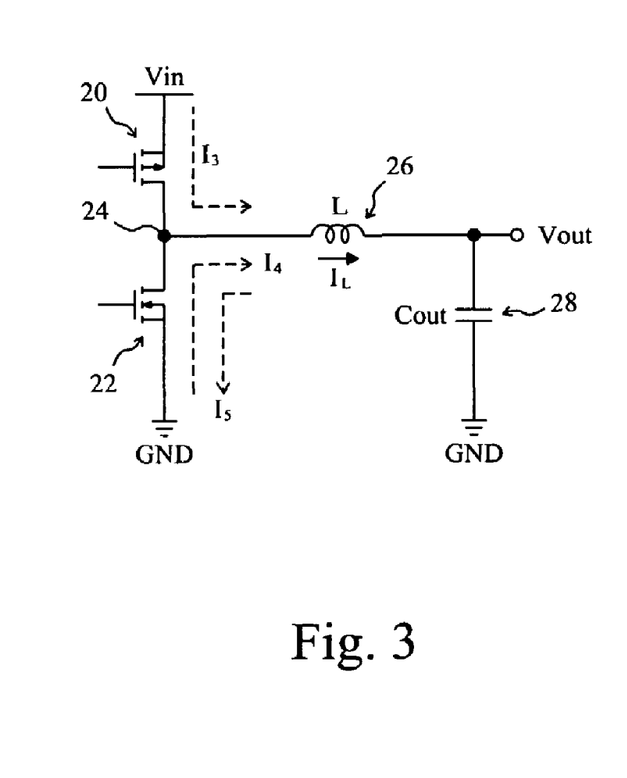
FIG. 3 shows a power stage of a synchronous switching regulator.
Figure 4:
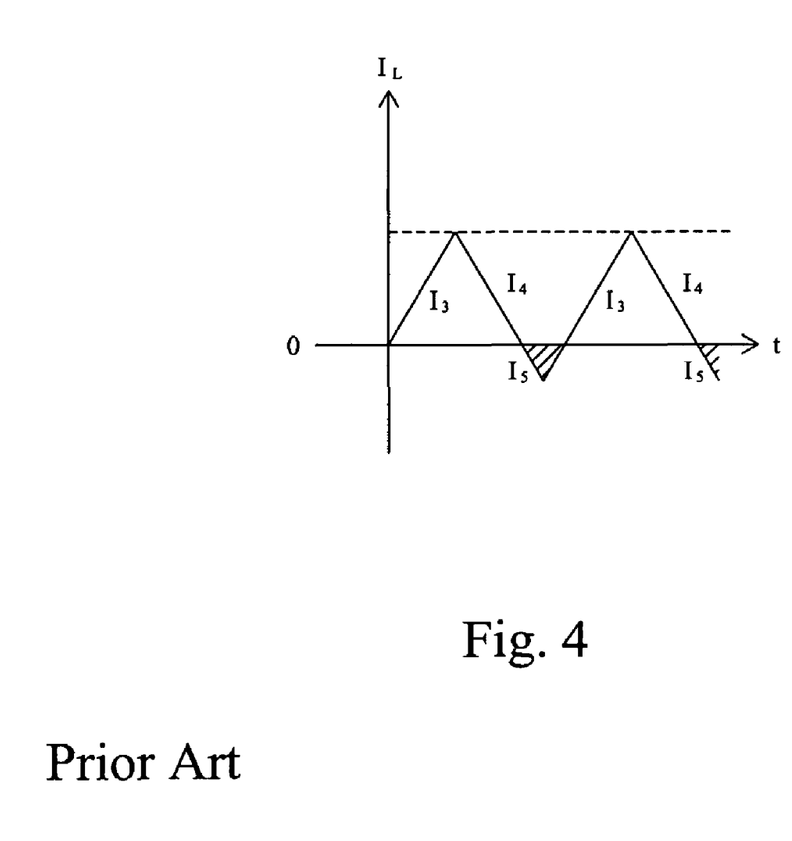
FIG. 4 is a waveform diagram of the inductor current of a synchronous switching regulator in light load condition.

FIG. 3 briefly shows a power stage of a synchronous switching regulator, which includes transistors 20 and 22 as the high-side and low-side elements for being alternatively switched, and its inductor current $I_L$ in light load or no load condition has the waveform as shown in FIG. 4. When the high-side transistor 20 is on and the low-side transistor 22 is off, current $I_3$ flows from the power input Vin to the output terminal Vout through the high-side transistor 20 and an inductor 26 to charge a capacitor 28, thereby increasing the output voltage Vout. After switching the high-side transistor 20 off and the low-side transistor 22 on, current $I_4$ flows from a ground terminal GND to the output terminal Vout through the low-side transistor 22 and the inductor 26, in such a manner that the inductor current $I_L$ decreases gradually. Because the low-side transistor 22 can conduct current in both opposite directions, the current $I_4$ will become a reverse current $I_5$, flowing from the capacitor 28 to the ground terminal GND through the inductor 26 and the low-side transistor 22, when it decreases to cross over zero, causing the capacitor 28 to release electric charges and thereby leading to power waste. Further, in order to maintain the output voltage Vout above some threshold, the transistors 20 and 22 are always alternatively switched on and off even in light load and no load condition, causing more switching loss. Therefore, a synchronous switching regulator has poorer efficiency in light load and no load condition.

Figure 5:
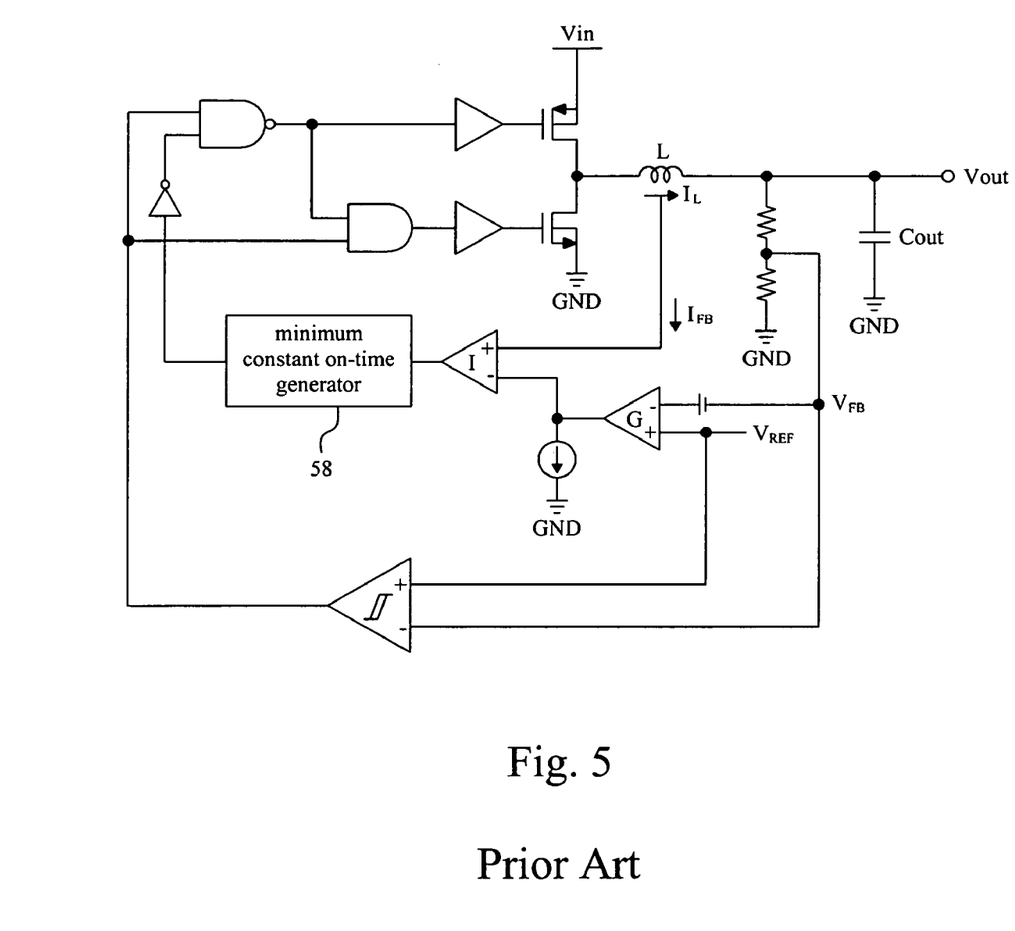
FIG. 5 shows a conventional synchronous switching regulator for preventing reverse current and for reducing switching loss.

To improve the efficiency of a synchronous switching regulator in light load and no load condition, U.S. Pat. No. 5,481, 178 to Wilcox et al. provides a control circuit and method to turn off both the high-side and the low-side transistors 20 and 22 for a time period if the load current supplied by the regulator to a load is down to a level which is below some threshold ratio of the rated output current or the inductor current $I_L$ is detected to be going to be reversed in direction. Similarly, U.S. Pat. Nos. 6,304,066 and 6,580,258 to Wilcox et al. turn off both the high-side and the low-side transistors 20 and 22 for a time period longer than the switching cycles of the high-side and low-side transistors 20 and 22, if the capacitor 28 is enough to maintain the output voltage Vout at a regulated level or the load current is lower than a threshold. Actually, those three arts are obvious to one skilled in the art. As described in FIGS. 1 and 2, an asynchronous switching regulator has pulse skipping function, and Krein and Bass teach in "Autonomous Control Technique For High-Performance Switches", IEEE Transactions on Industrial Electronics, Vol. 39, No. 3, June 1992, that the combination of a field-effect transistor (FET) and a current detector may emulate a diode for switching power converters. Therefore, the combination of a FET and a current detector may be used to replace the diode 12 of an asynchronous switching regulator, resulting in the switching regulators provided by Wilcox et al. For convenient illustration, FIG. 5 re-pictures the regulator provided by Wilcox et al., in which in order to control the high-side and low-side transistors of the power stage, the output voltage Vout is detected to produce a voltage feedback signal $V_{FB}$, the inductor current $I_L$ is detected to produce a current feedback signal $I_{FB}$, and the current feedback signal $I_{FB}$ is compared with a reference value to prevent reverse current and save power consumption when the regulator is in light load or no load condition. In such scheme, however, when the input voltage Vin is very close to the output voltage Vout, for example, in the case of Vin=3.3V and Vout=3V, the inductor current $I_L$ is so small that the difference between its increasing slope (Vin−Vout)/L=0.3/L and decreasing slope Vout/L=3/L is too large to turn off the low-side transistor in time, and thus reverse current will still occur. In addition, since the voltage feedback signal $V_{FB}$ is produced by connecting the resistor voltage divider to the output terminal Vout, and the network of inductor L and capacitor Cout has filter function, the response of this regulator to output variation is slower. Further, since the resistor voltage divider is far away from the power source Vin, the response to input voltage variation is also slower.

Figure 6:
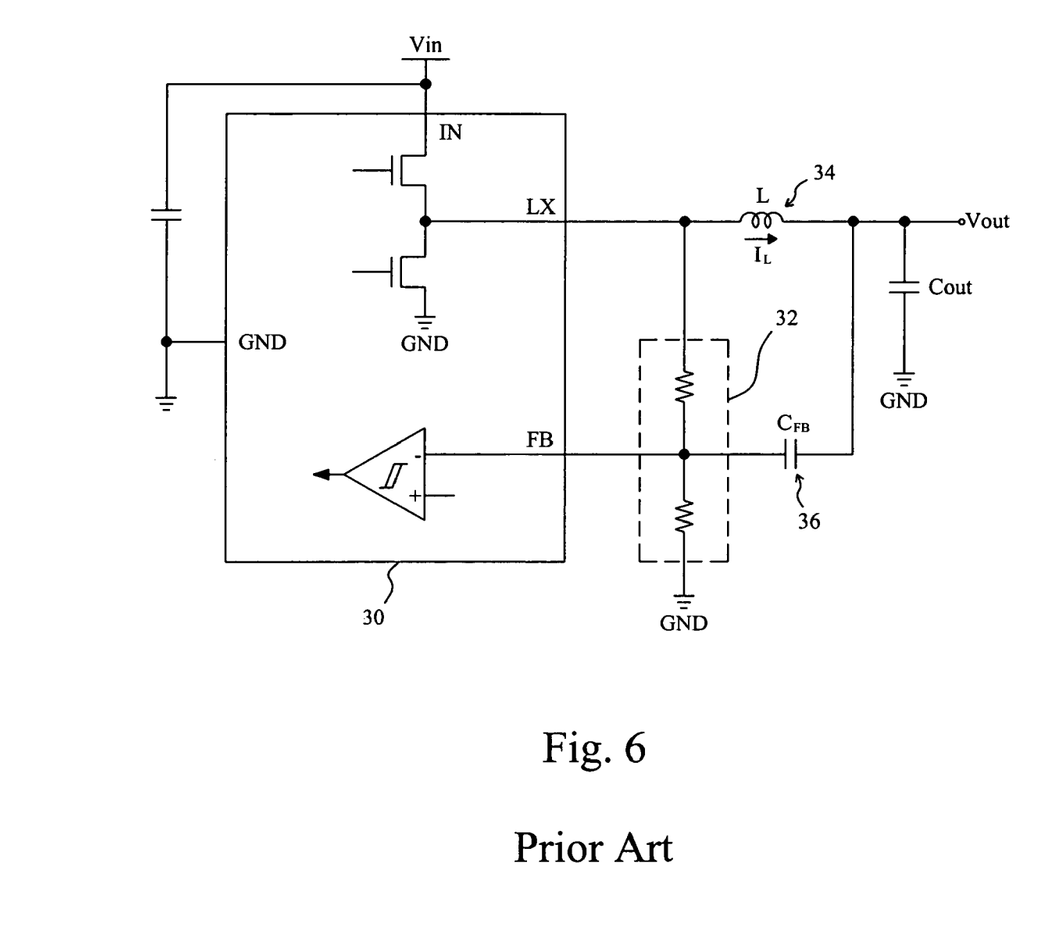
FIG. 6 shows a conventional synchronous switching regulator for quicker response to input voltage variation.

On the other hand, Maxim Integrated Products, Inc. disclosed an output information feedback method in the data sheet for products of part numbers MAX8560, MAX8561 and MAX8562 (http://www.maxim-ic.com/quick_view2.cfm/qv_pk/4009). For convenient illustration, FIG. 6 re-pictures an exemplary configuration of the data sheet, in which a resistor voltage divider 32 is connected to the switching node LX to produce a voltage dividing signal FB for feeding back to a hysteretic comparator in the controller 30. Because the feedback circuit 32 is connected to the switching node LX instead of the output terminal Vout, the response to input voltage variation is quicker than the regulator shown in FIG. 5. However, the data sheet MAXIM Company did not disclose any techniques either for preventing reverse current or for saving power consumption.

SUMMARY OF THE INVENTION

An object of the present invention is to improve the response speed of a switching regulator.

Another object of the present invention is to provide a high efficiency switching regulator.

According to the present invention, a quick response switching regulator comprises a power stage having a pair of high-side switch and low-side switch and an inductor connected together by a switching node, a feedback circuit connected to the switching node to produce a feedback signal at a feedback terminal, and a control circuit connected to the feedback terminal and the pair of high-side switch and low-side switch to produce a first control signal to control the high-side switch and a second control signal to control the low-side switch with reference to the feedback signal. Due to the feedback circuit connected to the switching node, the feedback path is shorter and as a result the response to input voltage variation is quicker. The control circuit monitors a current flowing through the inductor by a minimum current detector and keeps the low-side switch off before a peak of the inductor current becomes lower than some value.

In one aspect of the present invention, the control circuit further monitors a current flowing through the low-side switch by a zero current detector and turns off the low-side switch when the current flowing through the low-side switch becomes lower than some value.

In one aspect of the present invention, the control circuit further monitors a current flowing through the high-side switch by a current limit detector and resets the first control signal when the current flowing through the high-side switch becomes higher than some value.

In one aspect of the present invention, the control circuit further provides a pulse having a predetermined width by a minimum on-time generator for the high-side switch to be conductive for a time period not shorter than the predetermined width of the pulse once the high-side switch is turned on.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 7:
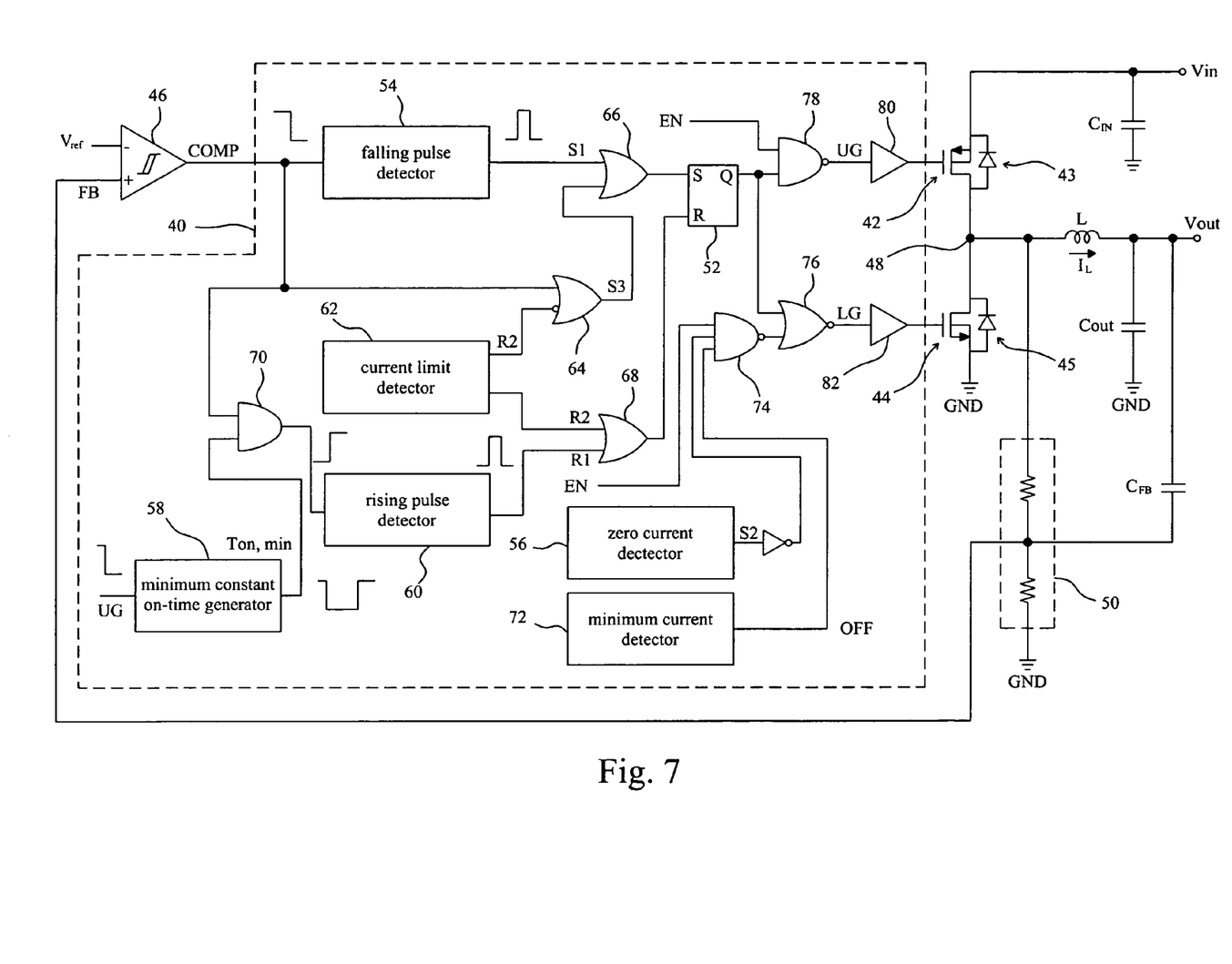
FIG. 7 shows a synchronous switching regulator according to the present invention.

FIG. 7 shows a synchronous switching regulator according to the present invention, in which only parts of the circuit needed for illustrating the present invention are provided in a simplified form. In this regulator, a power stage includes a high-side transistor 42 connected between a power input Vin and a switching node 48, a low-side transistor 44 connected between the switching node 48 and a ground terminal GND, an inductor L connected between the switching node 48 and an output terminal Vout, and a capacitor Cout connected between the output terminal Vout and a ground terminal GND, and in the power stage, diodes 43 and 45 represent the parasitic diodes of the high-side transistor 42 and the low-side transistor 44, respectively. A control circuit includes a logic and driver unit 40 and a hysteretic comparator 46, and with reference to a feedback signal FB, produces control signals UG and LG to control the high-side transistor 42 and the low-side transistor 44. A resistor voltage divider 50 is connected between the switching node 48 and ground GND to product the feedback signal FB for the hysteretic comparator 46 to compare with a reference signal $V_{ref}$ to produce a comparison signal COMP for the logic and driver unit 40. A capacitor $C_{FB}$ is connected between the output terminal Vout of the regulator and the feedback terminal FB of the resistor voltage divider 50. Because the resistor voltage divider 50 is connected to the switching node 48 instead of the output terminal Vout of the regulator, the path for producing the feedback signal FB is shorter than that of by monitoring the output terminal Vout, and therefore the regulator will have quicker response to any variations of the input voltage Vin or the output voltage Vout. Since the feedback speed is improved, the regulator does not require an oscillator for producing the control signals UG and LG, but only need to rely on the feedback signal FB from the resistor voltage divider 50, and with this aspect, the switching frequency of the regulator may be varied, thereby enhancing electro-magnetic compatibility (EMC) and reducing electro-magnetic interference (EMI). The resistor voltage divider 50 is provided to feed back the output information, and thus may be replaced by any other feedback circuits that may achieve the same purpose, only that it is established to monitor the switching node 48 instead of the output terminal Vout of the regulator. In addition, the capacitor $C_{FB}$ may be connected between the output terminal Vout and ground GND instead.

In the logic and driver unit 40, a SR flip-flop 52 is used to produce a PWM signal Q, which is triggered by the set input S and terminated by the reset input R. The set signal S is determined by the hysteretic comparator 46, a falling pulse detector 54, and a current-limit detector 62. The reset signal R is determined by the hysteretic comparator 46, a minimum constant on-time generator 58, a rising pulse detector 60, and the current limit detector 62. The falling pulse detector 54 is triggered by a falling edge of the comparison signal COMP, so as to produce a pulse signal S1 to trigger the PWM signal Q, and the rising pulse detector 60 is triggered by a rising edge of the comparison signal COMP, so as to produce a pulse signal R1 to terminate the PWM signal Q. In normal load condition, the inductor current $I_L$ is not close to zero, and the falling pulse detector 54 and the rising pulse detector 60 are responsible for monitoring the level changes in the comparison signal COMP to switch the transistor 42 and 44. In light load or no load condition, which means the average of the inductor current $I_L$ or the load current supplied by the regulator to a load is relatively small, a zero current detector 56, a current limit detector 62, a minimum current detector 72 help to control the transistor 42 and 44. The current limit detector 62 monitors the current flowing through the high-side transistor 42 to determine a signal R2, and when the current flowing through the high-side transistor 42 is greater than a value, the signal R2 is high. The inverted signal of R2 and the comparison signal COMP determine a signal S3 by an OR gate 64, and the signals S3 and S1 determine the set signal S by an OR gate 66. The signals R2 and R1 determine the reset signal R by an OR gate 68. When the current flowing through the high-side transistor 42 is greater than a value, the signal R2 is high, and thus the SR flip-flop 52 is reset and the high-side transistor 42 is turned off. The threshold of the current limit detector 62 limits the maximum current to flow through the high-side transistor 42. The minimum constant on-time generator 58 provides an additional function, which produces a pulse Ton,min having a constant width when the control signal UG is triggered, so as to limit the minimum conductive time of the high-side transistor 42 (to increase the output voltage Vout). As long as the high-side transistor 42 is turned on, it will last conductive for a time no less than the width of the pulse signal Ton,min, in order to prevent the hysteretic comparator 46 from being error operated to excessively switch the transistors 42 and 44 due to noises, thereby saving power consumption. An AND gate 70 decides the timing to trigger the rising pulse detector 60 in response to the pulse signal Ton,min and the comparison signal COMP. The minimum current detector 72 monitors the peak of the inductor current $I_L$ to determine a signal OFF, which is subsequently gated by a NAND gate 74 to determine the control signal LG in association with the PWM signal Q by a NOR gate 76. Before the peak of the inductor current $I_L$ is higher than a value Iref, the minimum current detector 72 will keep the low-side transistor 44 off by the signal OFF. The zero current detector 56 monitors the current flowing through the low-side transistor 44 to produce a signal S2, and when the current flowing through the low-side transistor 44 is less than zero, the signal S2 is high, thereby turning off the low-side transistor 44. An enable signal EN decides whether to allow the signal OFF to become effective by the NAND gate 74, and also decides whether to allow the control signal UG to be triggered by a NAND gate 78. The control signal UG drives the high-side transistor 42 by a driver 80, and the control signal LG drives the low-side transistor 44 by a driver 82. In this embodiment, the threshold of the zero current detector 56 is zero; while in other embodiments non-zero threshold may be used instead, and as long as the current flowing through the low-side transistor 44 is lower than this default value, the signal S2 is high.

Figure 8:
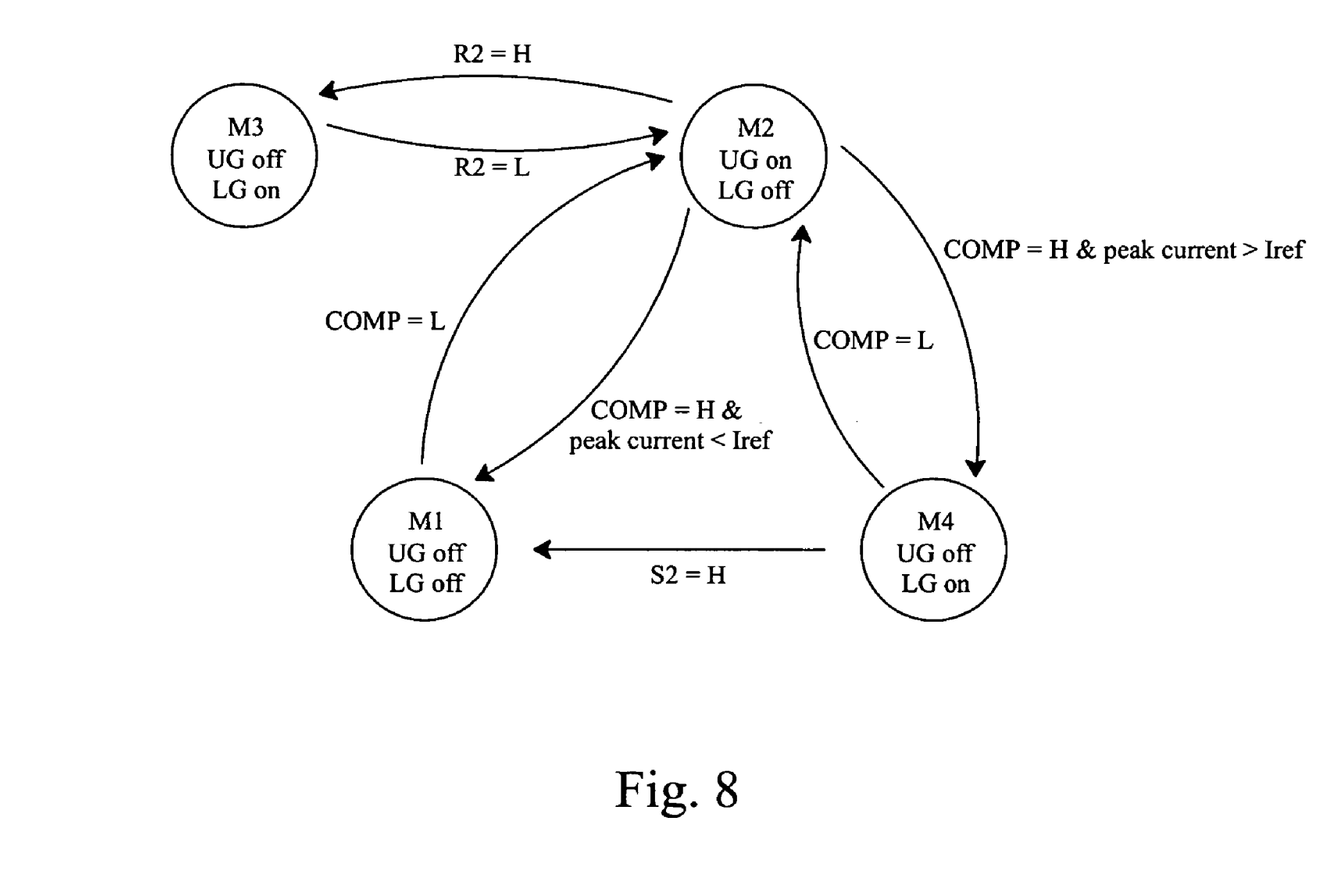
FIG. 8 is a state chart of the switching regulator shown in FIG. 7.

FIG. 8 shows a state chart of the transistors 42 and 44. Assuming that the regulator is at state M1 from start-up, this means that the transistors 42 and 44 are both off, and thus the control signals UG and LG are off. When the comparison signal COMP is low, which means the feedback signal FB is lower than the reference signal Vref, the state is switched to M2, and the control signal UG is on while the control signal LG is still off, and thus the high-side transistor 42 becomes conductive while the low-side transistor 44 does not. Therefore, the inductor current $I_L$ increases gradually, and the capacitor Cout is charged. Once the current limit detector 62 detects that the current flowing through the high-side transistor 42 is higher than a value, the signal R2 becomes high, which switches the regulator to state M3, thereby resetting the SR flip-flop 52 and turning off the PWM signal Q, and then the signal UG is switched off while the signal LG is switched on, in other words, the high-side transistor 42 is turned off and the low-side transistor 44 is turned on. Under the state M3, if the current flowing through the high-side transistor 42 is lower than a value, then the signal R2 becomes low, which switches the regulator back to the state M2. In another situation, the comparison signal COMP rises up and becomes higher than the reference signal Vref due to the increasing feedback signal FB, and the minimum current detector 72 detects that the peak of the inductor current $I_L$ is greater than the threshold Iref, the regulator is switched to state M4, in which the signal UG is switched off and the signal LG is switched on to allow the output voltage Vout to decrease. Under the state M2, if the comparison signal COMP is high and the peak of the inductor current $I_L$ is less than the threshold Iref, the regulator is switched to the state M1, in which the signals UG and LG are both switched off. Therefore, if the input voltage Vin and the output voltage Vout are close to each other, because the inductor current $I_L$ is very small, the peak of the inductor current $I_L$ detected by the minimum current detector 72 would always be lower than the threshold Iref, and thus the situation in which the signal UG is on and the signal LG is off (state M2) is directly switched to the signals UG and LG are both off (state M1), which prevents reverse current from occurring. Under the state M4, if the zero current detector 56 detects that the current flowing through the low-side transistor 44 is lower than zero, the signal S2 is switched to high, and thus the regulator is switched to the state M1, in which the signals LG and UG are both off.

Figure 9:
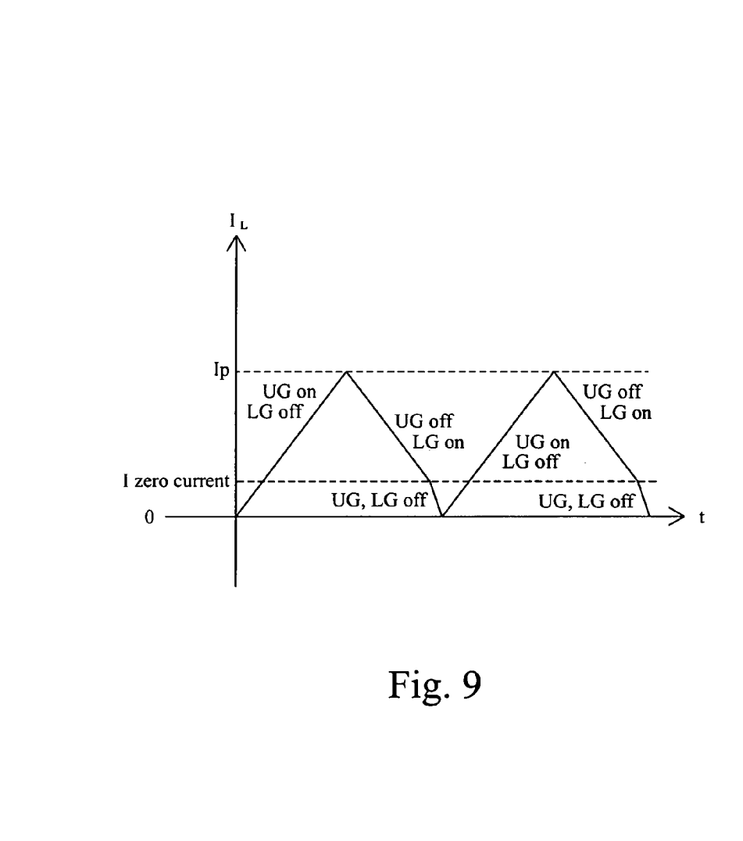
FIG. 9 is a waveform diagram of the inductor current when the regulator of FIG. 7 is in light load and the difference between the input voltage and the output voltage is large.

FIG. 9 shows how the inductor current $I_L$ varies in light load condition when the difference between the input voltage Vin and the output voltage Vout is large. When the signal UG is on and the signal LG is off, the inductor current $I_L$ increases, and when the signal UG is off and the signal LG is on, the inductor current $I_L$ decreases. Once the zero current detector 56 detects that the inductor current $I_L$ is lower than the default threshold I zero current, the signals UG and LG are switched off, and the inductor current $I_L$ is directed by the parasitic diode 45, and the decrease of the inductor current $I_L$ becomes quicker but without the occurrence of reverse current. As shown in FIG. 8, whether the signal UG is on or not is determined by whether the comparison signal COMP is low.

Figure 10:
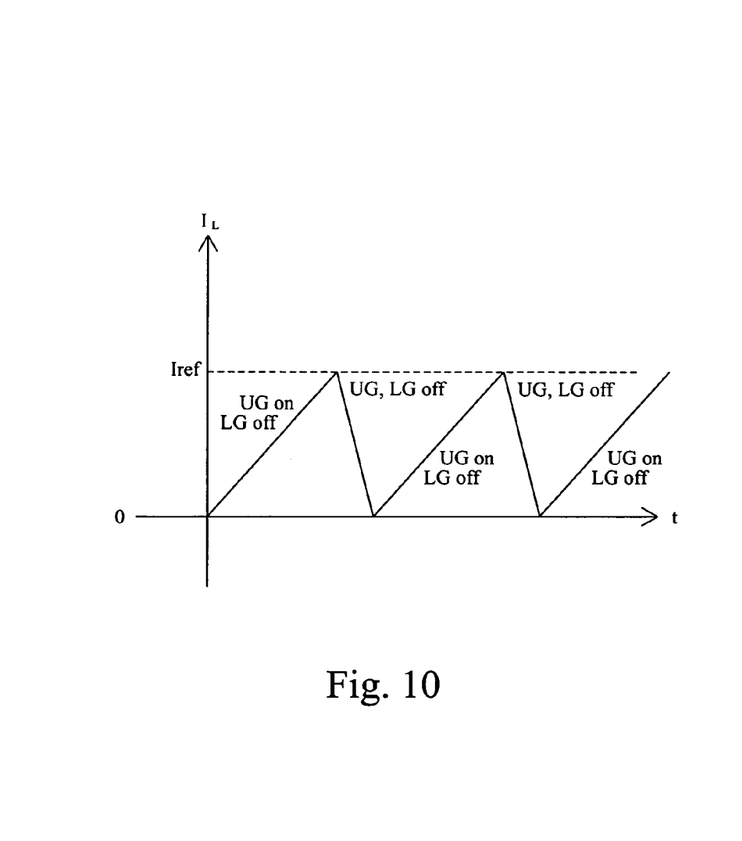
FIG. 10 is a waveform diagram of the inductor current when the regulator of FIG. 7 is in light load and the difference between the input voltage and the output voltage is small.

FIG. 10 shows how the inductor current $I_L$ varies in light load condition when the input voltage Vin is close to the output voltage Vout. The inductor current $I_L$ increases when the signal UG is on and the signal LG is off; once the threshold Iref is reached, the signals UG and LG are both switched off, and the inductor current $I_L$ is directed by the parasitic diode 45, so as to prevent reverse current from occurring.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A quick response switching regulator for producing an output voltage at an output terminal, comprising:
   a power stage having a high-side switch and low-side switch and an inductor connected together at a switching node offset from the output terminal;
   a feedback circuit connected to the switching node for producing a feedback signal at a feedback terminal; and a control circuit connected to the feedback terminal and the high-side switch and low-side switch, for producing a first control signal to control the high-side switch and a second control signal to control the low-side switch with reference to the feedback signal in an oscillator independent manner;

wherein the control circuit has a minimum-current detector for monitoring a current flowing through the inductor, in order to keep the low-side switch off before a peak of the inductor current is detected to be higher than a threshold.

2. The regulator of claim 1, wherein the feedback circuit comprises a resistor voltage divider for dividing a voltage at the switching node to produce the feedback signal.

3. The regulator of claim 2, further comprising a capacitor connected between the feedback terminal and the output terminal.

4. The regulator of claim 2, further comprising a capacitor connected between the output terminal and a ground terminal.

5. The regulator of claim 1, wherein the control circuit comprises:
   a hysteretic comparator for comparing the feedback signal with a reference signal to produce a comparison signal;
   a falling pulse detector for detecting a falling edge of the comparison signal so as to trigger the first control signal; and
   a rising pulse detector for detecting a rising edge of the comparison signal so as to reset the first control signal.

6. The regulator of claim 1, wherein the control circuit comprises a zero-current detector for monitoring a current flowing through the low-side switch, in order to turn off the low-side switch if the current flowing through the low-side switch is detected to be lower than a second threshold.

7. The regulator of claim 1, wherein the control circuit comprises a current limit detector for monitoring a current flowing through the high-side switch, in order to reset the first control signal if the current flowing through the high-side switch is detected to be higher than a second threshold.

8. The regulator of claim 1, wherein the control circuit comprises a minimum constant on-time generator for providing a pulse having a predetermined width for the high-side switch to be conductive for a time period not shorter than the predetermined width of the pulse once the high-side switch is turned on.

9. A control method for a quick response switching regulators producing an output voltage at an output terminal and having a high-side switch and low-side switch and an inductor connected together at a switching node, the control method comprising the steps of:
   monitoring a voltage at the switching node for producing a feedback signal, the switching node being offset from the output terminal;
   generating a first control signal for controlling the high-side switch and a second control signal for controlling the low-side switch responsive to the feedback signal in an oscillator independent manner; and
   monitoring a current flowing through the inductor for keeping the low-side switch off before a peak of the current flowing through the inductor is detected to be higher than a threshold.

10. The control method of claim 9, wherein the step of generating a second control signal with reference to the feedback signal comprises the steps of:
   comparing the feedback signal with a reference signal for producing a comparison signal;
   detecting a falling edge of the comparison signal for triggering the first control signal; and
   detecting a rising edge of the comparison signal for resetting the first control signal.

11. The control method of claim 9, further comprising the step of monitoring a current flowing through the low-side switch for turning off the low-side switch if the current flowing through the low-side switch is detected to be lower than a second threshold.

12. The control method of claim 9, further comprising the step of monitoring a current flowing through the high-side switch for resetting the first control signal if the current flowing through the high-side switch is detected to be higher than a second threshold.

13. The control method of claim 9, further comprising the step of generating a pulse having a predetermined width for the high-side switch to be conductive for a time period not shorter than the predetermined width of the pulse once the high-side switch is turned on.

* * * * *